United States Patent
Teague

(10) Patent No.: US 11,774,632 B2
(45) Date of Patent: *Oct. 3, 2023

(54) METHODS AND MEANS FOR MEASUREMENT OF THE WATER-OIL INTERFACE WITHIN A RESERVOIR USING AN X-RAY SOURCE

(71) Applicant: Philip Teague, Houston, TX (US)

(72) Inventor: Philip Teague, Houston, TX (US)

(73) Assignee: Visuray Intech Ltd. (BV1), Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,960

(22) Filed: Dec. 11, 2020

(65) Prior Publication Data

US 2021/0124083 A1 Apr. 29, 2021

Related U.S. Application Data

(63) Continuation of application No. 16/167,880, filed on Oct. 23, 2018, now abandoned.

(Continued)

(51) Int. Cl.
*G01V 5/12* (2006.01)
*H01J 35/02* (2006.01)

(Continued)

(52) U.S. Cl.
CPC .............. *G01V 5/12* (2013.01); *E21B 47/002* (2020.05); *E21B 47/11* (2020.05); *E21B 47/111* (2020.05);

(Continued)

(58) Field of Classification Search
CPC . G01V 5/12; G01V 3/18; G01V 5/125; E21B 47/002; E21B 47/11; H01J 35/02; H05G 1/04
See application file for complete search history.

(56) References Cited

U.S. PATENT DOCUMENTS 3,979,879 A * 9/1976 Rademacher ........... B65B 43/14
53/67
5,326,970 A 7/1994 Bayless
(Continued)

FOREIGN PATENT DOCUMENTS

EP 0860715 A1 * 8/1998 ........... G01N 23/083
WO 2016153566 A1 9/2016

OTHER PUBLICATIONS

Notification of Transmittal of the International Search Report and the Written Opinion of the International Searching Authority, or the Declaration issued in the corresponding PCT International Application No. PCT/US2018/057030, dated Feb. 1, 2019 (12 pages).

*Primary Examiner* — Kiho Kim
(74) *Attorney, Agent, or Firm* — Adams and Reese LLP; Ray R. Ferrera

(57) ABSTRACT

An x-ray-based reservoir evaluation tool for measurement variations in formation density anticipated at the water-oil interface of a reservoir is provided, the tool including at least: an internal length comprising a sonde section, wherein said sonde section further comprises an x-ray source; radiation measuring detectors; sonde-dependent electronics; and a plurality of tool logic electronics and PSUs. A method of using an x-ray based reservoir evaluation tool for measuring variations in formation density anticipated at the water-oil interface of a reservoir is also provided, the method including at least the following steps: using x-rays to illuminate the formation surrounding the cased borehole; uses detectors to directly measure the density of the formation; using detectors to directly measure the effects on the measurement from tool stand-off or production liner attenuation; and employing techniques for compensating for the production liner and liner-annular region when computing the saturated formation density within the production interval.

18 Claims, 3 Drawing Sheets

Related U.S. Application Data

(60) Provisional application No. 62/575,624, filed on Oct. 23, 2017.

(51) Int. Cl.
*G01V 3/18* (2006.01)
*E21B 47/002* (2012.01)
*E21B 47/11* (2012.01)
*H05G 1/04* (2006.01)

(52) U.S. Cl.
CPC .............. *G01V 3/18* (2013.01); *H01J 35/02* (2013.01); *H05G 1/04* (2013.01)

(56) References Cited

U.S. PATENT DOCUMENTS

| | | | |
|---|---|---|---|
| 6,725,161 B1* | 4/2004 | Hillis | G01V 1/48 |
| | | | 702/11 |
| 7,564,948 B2* | 7/2009 | Wraight | H01J 35/06 |
| | | | 378/101 |
| 2010/0229623 A1* | 9/2010 | Abad | E21B 49/08 |
| | | | 73/1.02 |
| 2012/0138782 A1 | 6/2012 | Simon et al. | |
| 2014/0083771 A1 | 3/2014 | Clark | |
| 2015/0039232 A1 | 2/2015 | Samworth | |

* cited by examiner

METHODS AND MEANS FOR MEASUREMENT OF THE WATER-OIL INTERFACE WITHIN A RESERVOIR USING AN X-RAY SOURCE

TECHNICAL FIELD

The present invention relates generally to management of hydrocarbon producing wells, and in particular though non-limiting embodiment to methods and means for directly determining the location of an oil-water interface for predicting reservoir fluid movement, and reservoir fluid ratios in a producing well through the use of x-ray measurement techniques.

BACKGROUND

Well or borehole logging is the practice of making an accurate record, known as a well log, of the geologic formations through which a borehole creates a path or conduit. Well logging activities are performed during all phases of an oil and gas well's development, e.g., drilling and evaluation, completion, production and abandonment.

The oil and gas industry logs rock and fluid properties to find hydrocarbon-bearing strata in the formations intersected by a borehole. The logging procedure consists of lowering a tool on the end of a wireline into the well to measure the properties of the formation. An interpretation of these measurements is then made to locate and quantify potential zones containing hydrocarbons and at which depths these zones exist.

Logging is usually performed as the logging tools are pulled out of the hole. This data is recorded in real-time via a data connection to the surface logging unit or using a memory unit aboard the tool to create either a printed record or electronic presentation called a well log which is then provided to the client. Well logging is performed at various intervals during the drilling of the well and when the total depth is drilled.

In a petroleum reservoir, oil is produced through a well under pressure of gas, water, or compaction. Water may be naturally present in the reservoir displacing the oil to urge it out through the well bore. Often, water is injected into the reservoir from an injection bore located near the production bore. As oil is extracted from the well, the water moves through the porous medium of the formation closer to the well and the oil-water interface changes shape. If the location of the oil-water interface is not monitored during production, it is possible that the well will produce a mixture of oil and water. In some cases, it is possible for the well to produce more water than oil.

Well logs are a primary source of information used to map the distribution of fluids in hydrocarbon reservoirs. Because of the high electrical resistivity of hydrocarbons compared to formation water, open hole well logs of resistivity are typically used to infer water saturation, the percentage of pore volume occupied by water. As wells are typically cased with conductive steel pipe after drilling, it is not usually possible to take resistivity measurements through the casing. If a non-conductive casing is used, cross-hole tomography techniques can be used to map the distribution of electrical resistivity in the reservoir volume.

Another possible technique would be to measure the bulk electron density of the reservoir formation directly. This could be achieved by using strong gamma emitters (such as Cesium-137). Compton scattering within the irradiated reservoir would result in returning gamma rays. However, the amount of $^{137}$Cs permitted in oilfield operations is limited by regulation to 1.5 Ci. As a result, the fluence of the source would not be viable at normal logging speeds (1,800 ft/hr.) to produce the statistics (of returning photons) necessary to make the measurement accurate enough to determine the differences in the saturation of water and oil within the formation.

The number of Compton scattering collisions is related directly to the number of the electrons per unit volume, or electron density, within the formation. Consequently, the electron density determines the response of the density tool.

Wellbore logging operations within the oil and gas industry currently use radioactive isotopes for the purpose of a ready supply of gamma-rays which are used in the evaluation of the geological formations surrounding a borehole.

The use of radioactive isotopes within oilfield operations such as the production, logistics, handling, operational use and disposal of such sources is controlled by regulation. The transport of such isotopes across geographical and political borders is heavily regulated and controlled, due to the risk associated with the potential to cause harm to humans, either accidentally or intentionally, through the direct dispersal of the radioactive materials across a populated region or indirectly via introduction into the food chain.

However, the use of such isotopes is tolerated as there has been no viable replacement for the technology until recently. The ability to replace radioactive isotopes with devices and methods which to not utilize radioactive materials boasts a number of key advantages when considering all aspects of the operational cycle of a wellbore log, from commercial to health, safety and the environment.

The use of $^{137}$Cs within oilfield operations is controlled through governmental regulation, export treaties and embargos. Generally, such isotopes are produced in a nuclear reactor in the country in which they are intended to be used. The transport of such isotopes across geographical and political borders is heavily regulated and controlled, due to the risk associated with the potential to cause harm to humans, either accidentally or intentionally, through the direct dispersal of the radioactive materials across a populated region or indirectly via introduction into the food chain.

After entering the body, $^{137}$Cs is generally uniformly distributed throughout the body, with higher concentrations manifesting in muscle tissues and lower concentrations in bones. The biological half-life of $^{137}$Cs is about 70 days. Experiments on canines showed that a single dose of 0.0038 Curie per kilogram is lethal within three weeks. Density logging operations in oilfield typically use 1.1 Curie of $^{137}$Cs which equates of a small volume of material weighing 0.012 grams.

The improper handling of $^{137}$Cs gamma ray sources can lead to release of the radio-isotope and consequently radiation injuries. Cesium gamma-ray sources that have been encased in metallic housings can be mixed-in with scrap metal on its way to smelters, resulting in production of steel contaminated with radioactivity.

In oilfield operations isotopes can be lost into the well as a result of the breakage of the logging tool at the risk of being irretrievable. Such events can lead to the closure of the well or measures taken to ensure that radioactive material cannot circulate or permeate out of the well. Indeed, direct contamination and the risk to oilfield workers of dangerous levels of exposure are not uncommon. Although comprehensive control measures are in place, the risk associated with the use of highly radioactive isotopes during oilfield operations will always be present—unless a viable isotope-free option can be introduced.

As is the nature of radioactive materials, the half-life of the material also determines its useful lifetime. Although density logging tools are calibrated to take into account the reduction in activity of an isotope, the useful life of the isotope is somewhat short-lived. A $^{137}$Cs source will be producing only half of its initial gamma-ray output after a period of 30 years. A consequence is that isotope-based sources need to be replaced at intervals, and the older isotopes disposed of. The disposal requirements must take similar precautions to that of normal nuclear waste, such as that produced as a waste product at nuclear power stations.

The typical regulatory limit for the amount of $^{137}$Cs which may be used during a logging operation is a maximum of 1.3 Curie. During density logging operations, a certain number of photons per second are required to enter into the detectors to ensure a high enough statistic for the purposes of data quality consistency and interpretation. As a result, density logging operations are normally performed such that the tool is moved at a rate of 1,800 ft./hr. to ensure sufficient photons enter the detectors at any particular depth to offer a data resolution acceptable to the client (typically a repeatability to 0.01 g/cc density). However, such a rate relates to open-hole logs, where the pad of the tool is in direct contact with the formation. In through-tubing or through-liner applications, the rate of photons reaching the detectors would be severely reduced by the attenuation of the photons by the production liner, and the structure/materials immediately in the annulus surrounding the liner.

Such operations cannot currently be performed any faster, as the speed of logging relates to the acquisition speed that is proportional to the output of the gamma-source. For safety reasons, the amount of $^{137}$Cs used may capped, with a resultant cap in the maximum amount of time available to perform a log.

Various means have been published which attempt to mitigate this issue by using gamma-ray sources. However, none of the prior art teaches a method of using x-rays to measure the variations in formation density anticipated at the water-oil interface; detection/determination of the water-oil interface through production liners; and techniques for compensating for the production liner and liner-annular region when computing the formation density.

U.S. Pat. No. 8,481,919 to Teague teaches methods and means of creating and controlling the required electrical power by serially stepping up the DC reference and creating high potential field control surfaces, to control either a bipolar or unipolar x-ray tube for the purposes of replacing chemical sources in reservoir logging. The reference also teaches moveable/manipulatable beam hardening filters and rotating light-house collimation on the source, the use of gaseous insulators including $SF_6$ as an electrical insulator in a downhole x-ray generator. However, it fails to disclose a method of using an x-ray technique to measure the variations in formation density anticipated at the water-oil interface; detection/determination of the water-oil interface through production liners; and techniques for compensating for the production liner and liner-annular region when computing the formation density.

US2018/0188410 to Teague et al. teaches methods and means of using an electronic x-ray device as a replacement for a chemical gamma-ray source when attempting to achieve a density computation to determine the density of a formation within an oil and gas well. The invention further teaches of a means of improving upon the accuracy of the measurement by using the significantly higher output of an x-ray source (compared to 1.5 Ci of $^{137}$Cs) to increase the axial offset of a bulk-density detector, while maintaining the statistical requirements necessary to achieve 0.01 g/cc repeatability, thereby permitting a depth of investigation that is outside of the 'mud invaded' zone of the formation within the oil & gas well. This method provides a framework for adding additional data to the litho-density measurement, and provides a method to remove uncertainty regarding mud-weight dependencies.

U.S. Pat. No. 7,675,029 to Teague et al. teaches and claims of the use of an x-ray device to create a two-dimensional image of a target object in a borehole using backscattered radiation from an x-ray source by means of a collimated detector.

U.S. Pat. No. 7,292,942 to Ellis et al. discloses a method of determining formation density in a cased hole environment using a logging tool having a gamma ray source; a long spacing detector; and a short spacing detector that develops one or more cased hole calibration relationships utilizing differences between scattered gamma rays observed by short spacing detectors and scattered gamma rays observed by long spacing detectors to determine corrected formation density values; and then using the cased hole calibration relationships and scattered gamma ray measurements obtained by the long spacing detector and the short spacing detector to determine the formation density.

U.S. Pat. No. 6,182,013 to Malinverno et al. discloses methods for locating an oil-water interface in a petroleum reservoir including taking resistivity and pressure measurements over time and interpreting the measurements. The apparatus of the invention includes sensors preferably arranged as distributed arrays. According to a first method, resistivity and pressure measurements are acquired simultaneously during a fall-off test. Resistivity measurements are used to estimate the radius of the water flood front around the injector well based on known local characteristics. The flood front radius and fall-off pressure measurements are used to estimate the mobility ratio.

U.S. Pat. No. 5,467,823 Babour et al. discloses a method and apparatus of monitoring subsurface formations containing at least one fluid reservoir and traversed by at least one well, by means of at least one sensor responsive to a parameter related to fluids, comprising the steps of: lowering the sensor into the well to a depth level corresponding to the reservoir; fixedly positioning said sensor at said depth while isolating the section of the well where the sensor is located from the rest of the well; and providing fluid communication between the sensor and the reservoir.

U.S. Pat. No. 5,642,051 to Babour et al. discloses a method and means for monitoring a fluid reservoir traversed by at least one well comprising the placing of at least one electrode in communication with the surface and fixed in a permanent manner within the well. Hydraulically isolating the section of the well in which it is located from the rest of the well and providing electrical coupling between the electrode and the reservoir. Subsequently, a current is passed through the reservoir; and an electrical parameter is measured, whereby a characteristic representative of the reservoir can be deduced.

U.S. Pat. No. 5,767,680 to Torres-Verdin et al. discloses time-lapse DC/AC measurements made with an array of permanently deployed sensors in order to detect and estimate the change in geometry and proximity of the oil-water interface as a result of production, and therefore as a function of time. The estimation is carried out with a parametric inversion technique whereby the shape of the oil-water interface is assumed to take the form of a threedimensional surface describable with only a few unknown parameters. A nonlinear optimization technique is used to search for the unknown parameters such that the differences between the measured data and the numerically simulated data are minimized in a least-squares fashion with concomitant hard bound physical constraints on the unknowns. The proposed estimation procedure is robust in the presence of relatively high levels of noise and can therefore be used to anticipate deleterious water breakthroughs, as well as improve the efficiency with which the oil is produced from the reservoir.

U.S. Pat. No. 7,564,948 (Wraight, et al.) discloses an x-ray source being used as a replacement for a chemical source during density logging along with various means of arranging the apparatus and associated power-supply, also teaches of the means of filtering the primary beam from the x-ray source such that a filtered dual-peak spectrum can be detected by a reference detector which is then used to directly control (feedback) the x-ray tube voltage and current for stability purposes. However, the references only discloses a compact x-ray device (bipolar) with a grid, a power supply, which is a Cockroft-Walton rolled up into a cylinder (disposed between two Teflon cylinders) in order to save space, and the aforementioned filtered reference detector method.

SUMMARY

An x-ray based reservoir evaluation tool for measurement variations in formation density anticipated at the water-oil interface of a reservoir is provided, in which the tool includes at least: an internal length comprising a sonde section, wherein said sonde section further comprises an x-ray source; a plurality of radiation measuring detectors; sonde-dependent electronics; and a plurality of tool logic electronics and PSUs.

A method of using an x-ray based reservoir evaluation tool for measuring variations in formation density anticipated at the water-oil interface of a reservoir is also provided, the method including at least the steps of: using x-rays to illuminate the formation surrounding the cased borehole; using a plurality of detectors to directly measure the density of the formation; using detectors to directly measure the effects on the measurement from tool stand-off or production liner attenuation; and compensating for the production liner and liner-annular region when computing the saturated formation density within the production interval.

BRIEF DESCRIPTION OF SEVERAL EXAMPLE EMBODIMENTS

The methods and means described herein for an electronic x-ray device describe a means that measures variations in formation density anticipated at the water-oil interface; detection/determination of the water-oil interface through production liners; and techniques for compensating for the production liner and liner-annular region when computing the saturated formation density within the production interval.

In the one embodiment, an x-ray based reservoir evaluation tool [101] is deployed by wireline conveyance [103] into a cased borehole [102], wherein the tool is deployed into the reservoir to aid production logging. The tool is enclosed by a pressure housing which ensures that well fluids are maintained outside of the housing.

Figure 1:
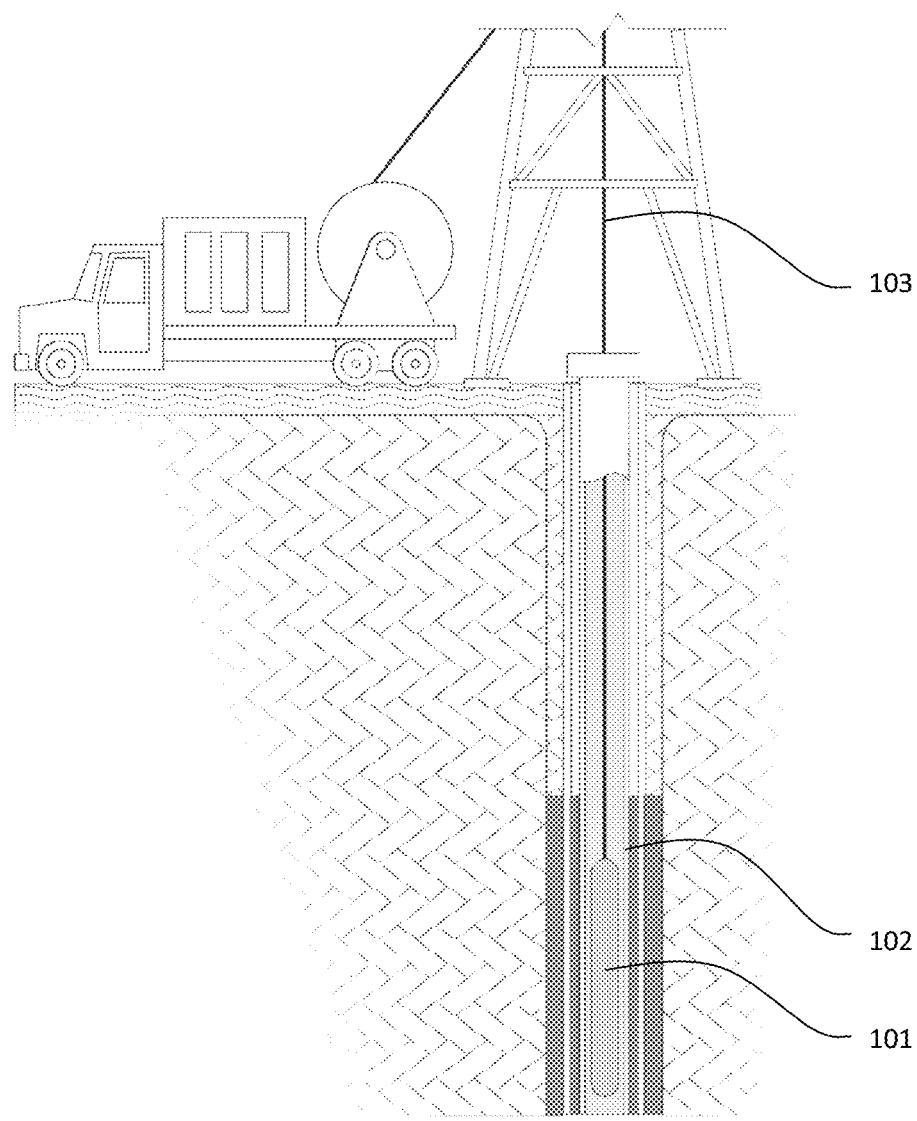
FIG. 1 illustrates an example x-ray-based reservoir evaluation tool being deployed into a borehole via wireline conveyance.
Figure 2:
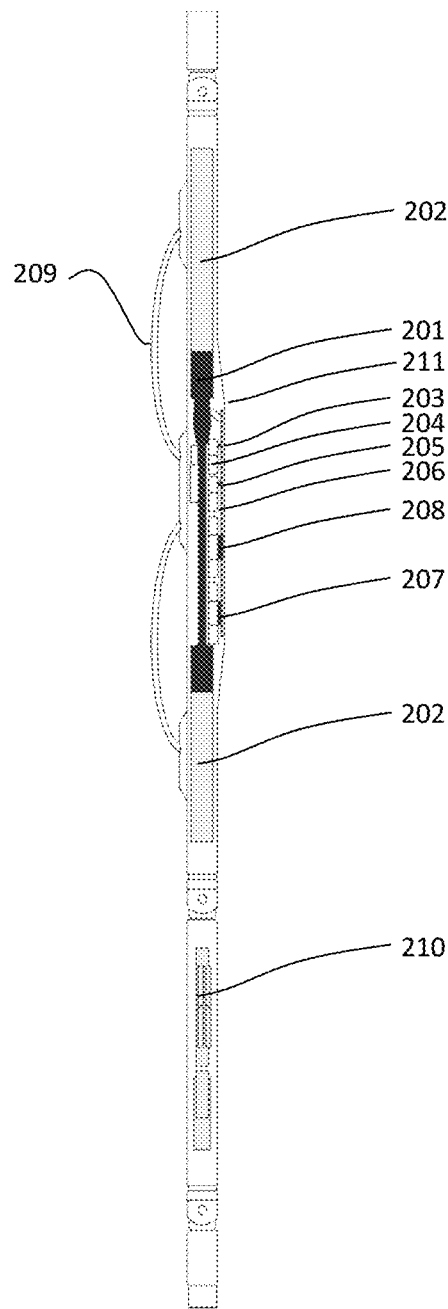
FIG. 2 illustrates another example of a physical layout of an x-ray-based reservoir evaluation tool.

FIG. 2 is an example embodiment illustrating how the x-ray source [201] is located within a pressure-housing containing a padded section [211]. The x-ray source is powered by one or more high-voltage generators [202]. A collimated detector [203, 204] is used to measure the offset between the pad [211] and a production liner or tubing. In further embodiments, additional detectors [205, 206] are employed to measure the response from the production liner or tubing. The bulk density of the saturated formation is measured by a long-offset detector [207]. The density of the annular region surrounding the production liner is measured by a still further detector [208]. The pad-face of the tool is maintained against the inner face of the production liner/tubing by mechanical methods [209]. The output from the detectors is processed within the downhole tool [210] electronics.

Figure 3:
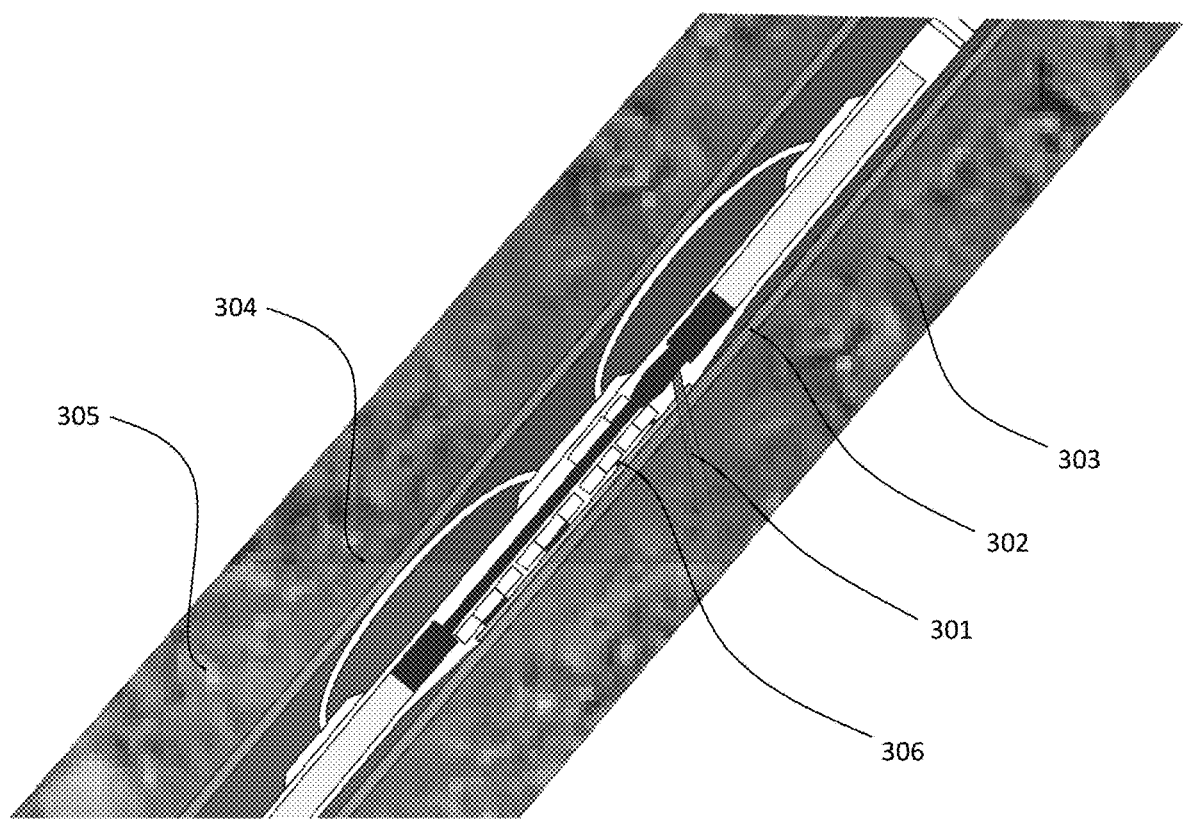
FIG. 3 illustrates a still further example example of a physical layout of an x-ray-based reservoir evaluation tool, and how the tool would be used to determine the location of the oil-water interface within a reservoir through a production liner/casing.

FIG. 3 is a further example embodiment illustrating how the x-ray source [201] produces a beam of x-rays [301] that penetrate through the production liner/casing [302] such that the saturated formation density, either containing oil [303] or water [305] are directly measured in order to determine the location of the water-oil interface [304]. Reference detectors [306] positioned to be optimized for measuring liner/casing/tubing and near-field annular material density are used to compensate for variable material densities and attenuation profiles between the tool and the saturated formation.

For the reservoir to be a reservoir, the formation materials must exhibit some porosity. The oil within the pores of the formation typically has a lower density than the [salty] water located within the pores of the formation; consequently, the bulk-density of the formation materials itself is different on either side of the water-oil interface. These differences in bulk formation density, due to the saturation of the water and oil at difference depths, permits the possibility of measuring the formation density using the Compton-scattered x-rays produced when the x-ray source [201] illuminates the formation [303, 305] while being conveyed through the production interval.

In one example embodiment, the near-field detectors [203, 204, 205, 206] are used to compensate for any near-field structural or material attenuation effects that could adversely affect the quality of the formation density measurement. The result would be a density log, displayed as a function of what would clearly indicate the depth at which the water-oil interface is located. In a further embodiment, the x-ray source tube [201] is driven in a monopolar configuration. In a still further embodiment, the x-ray source tube [201] is driven in a bipolar configuration. In a further embodiment still, the x-ray source tube [201] is monitored by a reference detector that measures the fluence of the source as a function of time, such that the primary detector measurements may be compensated for. In yet another example embodiment, near-field liner/tubing offset detector [203, 204] is used to determine whether the x-ray source beam [301] is passing through a perforation in the production liner/casing, such that this variance in the computed long-space density can be noted as a function of depth.

In a further embodiment, near-field liner/tubing offset detector [203, 204] is not required, if the outer diameter of the pad [6] is tailored to match the inner diameter of the production liner. In a further embodiment, calibration techniques are employed prior the deployment of the tool such that the effect of various production liners and production tubing are parameterized to help inform the compensation scheme of data processing.

In a still further embodiment, the density log data is combinable with other measurements, such as neutron porosity, to improve the quality of the interpretation of the data and better determine the depth at which the water-oil interface exists. In a further embodiment still, existing open-hole logs are used to establish a baseline profile as a function of depth for the formation density, such that sensitivity to the water-oil interface is improved.

In a further embodiment, machine learning is used such that algorithms are taught the indicators of the water-oil interface when comparing logs and log types, such that the process of determining the location of the water-oil interface is then automated (i.e., requiring no initial human interpretation).

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray based reservoir evaluation tool for measurement variations in formation density anticipated at the water-oil interface of a reservoir, wherein said tool comprises:
    a plurality of radiation measuring detectors and additional axially-offset radiation detectors for compensating for the production liner and liner-annular region effects when computing the formation density within the production interval, wherein said plurality of sensors are disposed in communication with an internal length comprising a sonde section, wherein said sonde section further comprises an x-ray source; sonde-dependent electronics; and a plurality of tool logic electronics and power supply units.

2. The tool of claim 1, further comprising a detector used to measure casing standoff such that other detector responses are compensated for tool stand-off.

3. The tool of claim 1, wherein a shield further comprises tungsten.

4. The tool of claim 1, wherein the tool is configured so as to permit through-wiring.

5. The tool of claim 1, wherein a reference detector is used to monitor an azimuthal output of the x-ray source.

6. The tool in claim 1, wherein the tool is combinable with other measurement tools comprising one or more of neutron-porosity, natural gamma and array induction tools.

7. The tool in claim 1, wherein the tool is used to determine the position of the water-oil interface through production liners or production casing.

8. The tool in claim 1, wherein the tool is integrated into a logging-while-drilling assembly.

9. The tool in claim 1, wherein the tool is powered by mud-turbine generators.

10. The tool in claim 1, wherein the tool is powered by batteries.

11. A method of using an x-ray based reservoir evaluation tool for measuring variations in formation density anticipated at the water-oil interface of a reservoir,
    wherein said method uses additional axially-offset radiation detectors for compensating for the production liner and liner-annular region effects when computing the formation density within the production interval, said method further comprising:
    using x-rays to illuminate the formation surrounding the cased borehole;
    using a plurality of detectors to directly measure the density of the formation;
    using detectors to directly measure the effects on the measurement from tool stand-off or production liner attenuation.

12. The method of claim 11, further comprising using a detector that is also used for measuring casing standoff so that other detector responses may be compensated for tool stand-off.

13. The method of claim 11, further comprising using a reference detector to monitor the azimuthal output of an x-ray source.

14. The method of claim 11, further comprising combining other measurement methods comprising one or more of neutron-porosity, natural gamma and array induction tools.

15. The method of claim 11, further comprising using the tool to determine the position of the water-oil interface through production liners or production casing.

16. The method of claim 11, further comprising integrating the tool into a logging-while-drilling assembly.

17. The method of claim 11, further comprising powering the tool using mud-turbine generators.

18. The method of claim 11, further comprising powering the tool using batteries.

* * * * *